Dec. 7, 1954
M. J. OLSCHWANG
2,696,138
RETAINING AND FASTENING DEVICE
Filed Oct. 14, 1950
2 Sheets-Sheet 1
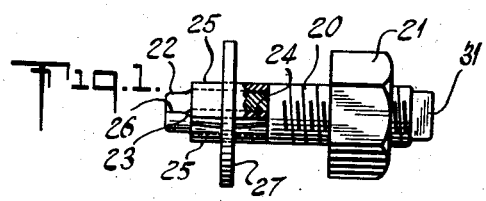
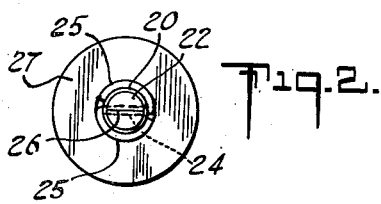
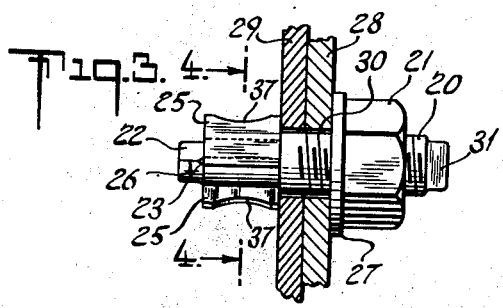
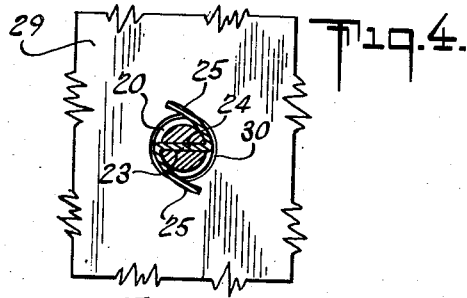
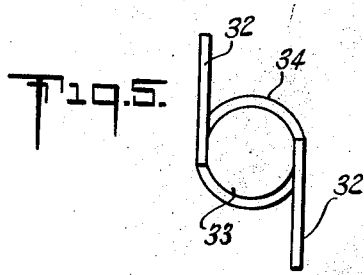
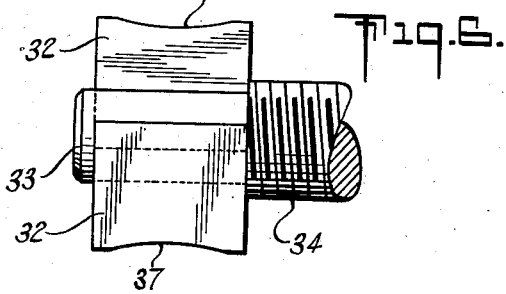
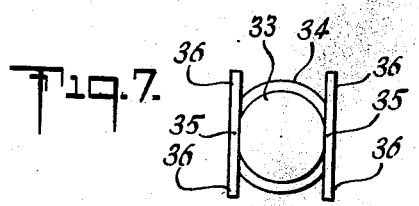
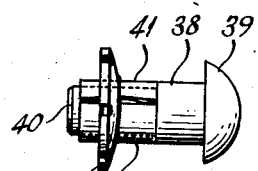
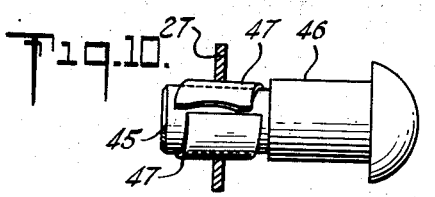
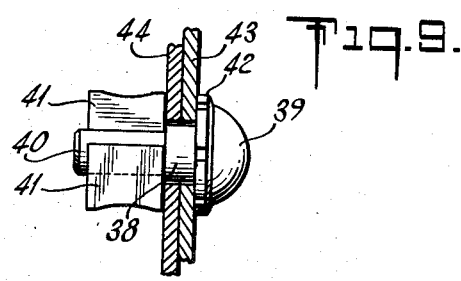
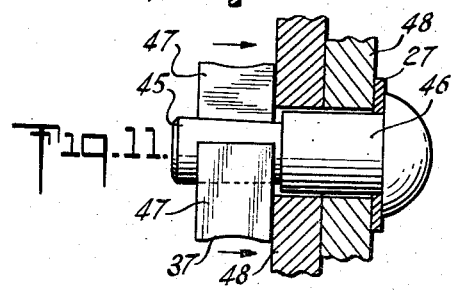
INVENTOR.
MORRIS J. OLSCHWANG
BY
Van Derenter & Shively
ATTORNEYS.

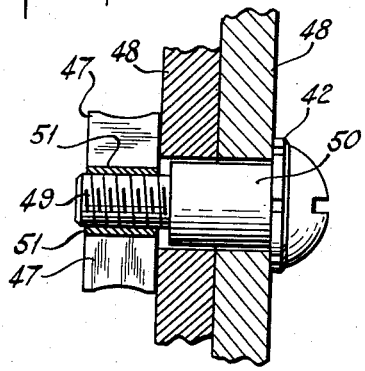
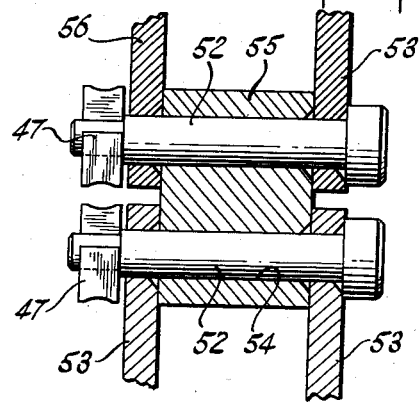
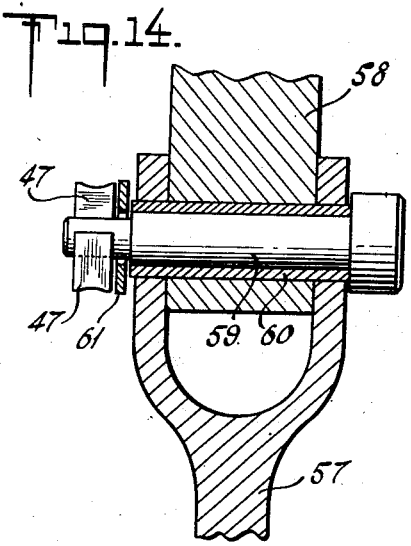
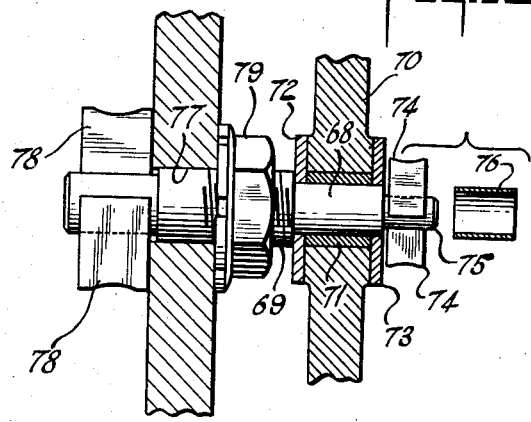
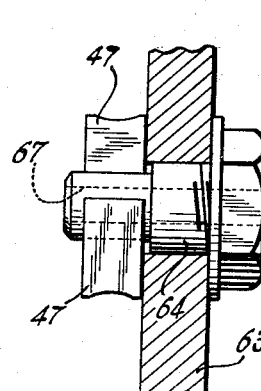
INVENTOR.
MORRIS J. OLSCHWANG
BY
Van Deventer & Lively
ATTORNEYS.

United States Patent Office 2,696,138
Patented Dec. 7, 1954

2,696,138

RETAINING AND FASTENING DEVICE

Morris J. Olschwang, New York, N. Y.

Application October 14, 1950, Serial No. 190,207

4 Claims. (Cl. 85—3)

The present invention pertains to improvements in retaining and fastening devices.

An object of the invention is to provide an improved retaining structure applicable to bolts, rivets and related devices for installation in blind holes or the like.

A further object is to provide an improved bolt, rivet or pin structure for insertion through a hole in one or more plates or walls, the structure including one or more spring leaves secured to or formed on the leading end of the bolt, rivet or pin and normally flexed about the latter circumferentially but adapted to spring out tangentially upon emergence from the inner or blind end of the hole.

Another object is to provide a structure of the above type in which the spring leaves, while resilient in a plane normal to the axis of the device, have a high degree of rigidity and strength in the axial direction, by which means the bolt, rivet or pin is rigidly retained in the hole.

A further object is to provide a structure of the above type including an annular member normally retaining the locking leaves flexed inward as noted, the member being slidable up the shank of the device to disengage the leaves as the latter pass into the hole.

A still further object is to provide a structure of the above nature in which the retaining member comprises a spring washer or the like adapted to be compressed between the head of the structure and the wall or plate to hold the device in axial tension after the locking leaves have expanded.

Another object is to provide a device of the above type adapted to machine assemblies in which the means for initially holding the locking springs flexed inward becomes a working part of the machine when assembly is completed.

Other objects and advantages of the invention will become evident during the course of the following description in connection with the accompanying drawings, in which:

Fig. 1 is a side elevation of a bolt structure embodying one form of the invention;

Fig. 2 is a front end view of the same;

Fig. 3 illustrates the application of the above device to securing two plates together;

Fig. 4 is a detail view of the spring locking member in expanded position;

Fig. 5 is an end view of an alternative means of securing the locking spring leaves to the end of the bolt, showing the leaves in expanded position;

Fig. 6 is a side view of the same;

Fig. 7 is a view similar to Fig. 5 but illustrating a double-ended form of the locking springs;

Fig. 8 shows a rivet-type form of the invention with a spring-washer comprising the retaining ring;

Fig. 9 shows the same applied to securing two plates together;

Fig. 10 shows the invention applied to a tapered-end rivet structure;

Fig. 11 illustrates the same with the springs in expanded position to provide axial tension;

Fig. 12 shows a structure in which the locking tongue mounting on the body member takes the form of a threaded sleeve or nut instead of direct fastening;

Fig. 13 shows an application of the invention in which the spring contracting member comprises an operative portion of a chain assembly;

Fig. 14 similarly shows an application to a connecting rod assembly;

Fig. 15 shows an application to an attachment fitting for pipes, conduits and the like; and Fig. 16 illustrates a typical application to stationary shafts or pins suitable for mounting gears, pulleys and the like.

Referring to Figures 1 and 2, the numeral 20 denotes a cylindrical member having a threaded shank carrying a nut 21. The front end 22 of the member 20 opposite the nut has a cross-slot 23 in which is disposed a leaf-spring member having the general shape shown in Figure 4 when in unflexed position, comprising a straight central portion 24 engaging the slot 23 and two angularly extending terminal cantilever leaves 25. To retain the spring member in place the split end 22 of the member 20 may conveniently be upset inward and welded at 26 if desired.

The leaves 25, while thin enough to be flexible in the plane normal to the axis of the bolt member 20, are sufficiently wide as to be substantially rigid in the axial direction. In the normal condition of the device, that is prior to its installation, the leaves 25 are held flexed inward or wrapped around the member 20 by an annular ring or washer 27 slidably mounted thereon, as shown in Figures 1 and 2.

An application of the device is typically illustrated in Figure 3, wherein it is used to fasten together two plates 28 and 29 having a common clearance hole 30, the hole being of slightly greater diameter than the diametral dimension of the inwardly flexed leaves 25. As the device is thrust into the hole 30 the washer 27 encounters the wall 28 which restrains the washer's further motion, causing the leaves 25 to slide from within the washer and be released thereby within the hole. The bore of the hole 30 holds the spring leaves flexed inward until they emerge therefrom, whereupon they spring outward behind the rear plate 29 as shown in Figures 3 and 4. Thereafter any tendency to withdrawal of the bolt is prevented by the edge pressure of the springs 25 against the back of the plate 29. The nut 21 may be turned down to squeeze the plates together with any desired pressure, as the resisting force of the leaves is furnished by the latter in their edge-wise direction, in which their section modulus is maximum and in which their resistance to shear and bending may, if required, be made equal to the tensile strength of the bolt member 20. Suitable wrench flats 31 or the like may be provided on the member 20 to allow the latter to be held against rotation while the nut 21 is tightened.

In the types shown in Figs. 5 and 6 the locking spring leaves 32, instead of being formed in one piece and retained in a slot, are formed separately and secured to the reduced forward end 33 of the bolt member 34 by resistance welding or the like. It will be evident that this form of the device is not limited to two springs, as any practical number from one upward may be used if desired. A variation appears in Fig. 7, in which two spring members are welded to the bolt end 33 at their middle zones, each thus providing two oppositely extending spring locking tongues or leaves 36. The operation of these types is the same as that already described. Shallow notches 37 may be provided in the outer ends of the spring leaves as shown in Fig. 6, to assist in holding the retaining or contracting ring in place against accidental displacement in handling.

In the form of the device shown in Figures 8 and 9 the elongated member 38 comprises the shank of a rivet having a head 39 and a reduced front end portion 40 carrying locking spring leaves 41 of any of the types already described. In this type the contracting ring 42 is preferably a spring washer having resilience in the axial direction. In application the length of the shank 38 is so proportioned to the total thickness of the plates 43 and 44 to be fastened together, that the locking leaves 41 cannot spring outward until the washer 42 is flattened under the head 39. Thereupon, after the leaves 41 have sprung outward as shown in Fig. 9, the axial pressure of the washer 42 maintains the joint tight at all times. It will be obvious that the spring-type washer may also be used with the embodiment shown in the previous figures if desired.

In the rivet-type fastener shown in Figs. 10 and 11 the reduced portion 45 of the shank member 46 is made slightly conical with the larger end of the cone outward and with the spring leaves 47 fastened thereto. When the leaves 47 are coiled around the conical portion 45 they spiral toward the end thereof as shown in Fig. 11, so that when released during assembly, their uncoiling motion has an axial component which causes them to engage the back of the wall or plate 48, thus drawing the rivet tight. The helical angle necessary to produce the described tightening action is so small that the leaves 47 remain substantially rigid in the axial direction. At the same time the axial tightening action allows the holding or retaining washer 27 to be of the plain type instead of the spring form shown in Figs. 8 and 9, though of course the latter type may also be used if desired.

In the form shown in Fig. 12 the reduced portion 49 of the body member 50 is threaded and carries an internally threaded nut or ferrule 51 to which the spring tongues 47 are directly fastened. This method of securing the locking leaves or tongues on the end of the body member is particularly applicable to machine screws, cap screws and the like adapted to tightening by turning the screw head in the usual manner.

The holding or contracting member may be a spring washer 42 adapted to press the leaves 47 against the wall 48 and thus prevent them from turning as the screw is tightened, or if desired the nut or ferrule 51 may be tapered in the manner of the portion 45 in Figs. 10 and 11, the uncoiling leaves themselves furnishing the initial tension in the manner previously described. The tangential direction of the expanded tongues may advantageously be made such as to cause their holding edges to "dig in" and grip the rear face of the wall 48 when the screw is turned in the tightening direction.

Figure 13 illustrates the invention applied to the pins 52 of a block chain. In this case the side link 53 may be used to retain the tongues 47 contracted until they enter the hole 54 in the block 55. Thereafter the tongues are pushed forward through the block 55 and the opposite side link 56 until they spring outward to lock the assembly as shown.

Fig. 14 similarly illustrates an application to a wrist pin structure joining a connecting rod 57 to a cross-head 58. The pin 59 is mounted in a floating bushing 60, and prior to installation the bushing 60 is disposed around the leaves 47 to hold them coiled inward during assembly. The bushing carrying the partially inserted pin 59, is installed fully in the rod 57 and cross-head 58, and the pin 59 is then pushed through into locking position. A thrust washer 61 may be slipped over the spring leaves 47 as they emerge from the bushing and held in place until the leaves spring out behind it as shown.

In Fig. 15 the invention is applied to a means for attaching tubular members such as pipe railings 62 to walls or bulkheads 63 by providing the body member 64 with an outer terminal pipe thread 65 adapted to receive the usual pipe coupling sleeve 66. Similarly, providing the body 64 with an interior passage 67 renders it conveniently applicable as an entry fixture for conduit boxes and the like.

Fig. 16 illustrates a double application of the invention to mounting a machine part on a wall or machine frame and also to retaining a working part or sub-assembly on the mounted part. In the illustration the outer portion 68 of the body member 69 comprises a stationary journal or pivot shaft for a rotatable gear or pulley 70 provided with an internal bushing 71 and thrust washers 72 and 73. Spring tongues 74 of any of the types already described are secured to the reduced outer extension 75 of the journal 68. The extension 75 and springs 74 are so proportioned that the latter may be held coiled inward by a thin slidable sleeve 76 of a diameter equal to or slightly less than the diameter of the main journal 68.

In assembly the pulley or gear 70 and the washers 72 and 73 are slipped over the sleeve 76 restraining the springs 74 and into place on the journal 68, after which the sleeve 76 is slid off to release the springs as shown. The use of a suitable sleeve in the manner described for normally holding the springs 74 flexed inward is particularly advantageous in machine structures of this type, as it promotes quick and easy assembly of multiple parts and prevents possible internal scoring of the bearing bushing 71 by direct sliding contact of springs 74 therewith. The main fastening body member 69 may be made a light press fit in the hole 77, and due to the high axial strength and rigidity of the inner locking spring leaves 78, heavy axial tension may be supplied by the nut 79 to ensure permanent rigidity of the assembly against rocking stresses.

From the foregoing examples it will be evident that the invention lends itself to a wide variety of types and forms. However, it will also be evident to those skilled in the art that all the illustrated forms are generically the same, each comprising a body member adapted to fit in a suitable hole and one or more leaf springs attached to the entering end of the body member with their width dimension substantially parallel to the axis of the body member whereby they are substantially rigid in the axial direction, the springs being flexible laterally inward within the hole's lateral extent. It will also be noted that each type combines with the above structure a member which normally, that is prior to assembly, holds the springs flexed inward, the holding members being washers, sleeves, or parts of the future machine assembly itself, all slidable from the springs to release the springs and complete the assembly.

The extreme holding strength of the locking springs, derived from the arrangement which brings the axial stress in the direction of their maximum section modulus, renders the device much superior in this respect to types of fasteners in which the holding strength is any function of spring strength in a plane of resilience. At the same time the simplicity, compactness and ease of application for example to blind holes, are obvious advantages over such comparatively complicated and cumbersome prior devices as toggle bolts and related mechanical locking means.

In the examples shown the spring locking tongues have been illustrated as separate members attached by slot mounting, resistance welding or the like, but for some types the leaves may be formed integrally with the bodies by forging, stamping or fabrication from special rolled shapes, the locking end including the leaves being properly hardened and tempered after forming is completed. Also, while the spring leaves are illustrated as of generally rectangular shape, they are not necessarily limited thereto but may be provided with tapered outer edges, rounded corners or similar variations if desired for particular purposes.

In other words, while the invention has been described in preferred form it is not limited to the exact structures illustrated, as various modifications may be made without departing from the scope of the appended claims.

What is claimed is:

1. A fastening device for securing together a plurality of members formed with aligned openings, said device comprising a shank of length and thickness adapting it to be passed through the openings with opposite end portions protruding from ends of the openings, said shank being threaded from one end for a portion of its length and having its other end provided with a diametrically extending passage elongated longitudinally of the shank, a nut screwed upon the threaded portion of said shank for movement along the shank to a clamping position at one side of said members, and a resilient strip of appreciably greater width than thickness passing through said passage with opposite end portions projecting therefrom each end portion having narrow edges presented towards the nut and wide side faces extending parallel to the shank axis and each of said end portions extending in the same direction circumferentially of the shank and constituting tongues having free ends normally spaced laterally from the shank a distance adapting them to have abutting engagement with said members at the opposite side thereof from said nut, the said free end portions of the resilient tongues being adapted to be flexed inwardly to a retracted position close against the shank whereby the tongues and the portion of the shank carrying the same may be passed through the said openings and the tongues spring away from the shank to an operative position.

2. The structure of claim 1 wherein the end portion of the shank through which the passage is formed is of reduced diameter and provides a circumferentially extending seat of a depth corresponding to the thickness of the resilient strip whereby the tongues when in a retracted position are entirely disposed in the seat and within the plane of the circumferentially extending surface of the threaded portion of the shank.

3. The structure of claim 1 and an annular restraining member fitting about the shank and said tongues and engaging free ends of the tongues to hold the tongues in a retracted position, said annular member being shiftable along the shank from a restraining position about the tongues to a position in which it is disposed between the nut and the confronting side of the members through which the shank passes and the said members gripped between the annular member and the extended tongues by action of the tightened nut.

4. The structure of claim 3 wherein the annular member constitutes a nut-engaging washer and free ends of the tongues are formed with recesses in which the annular member engages to releasably hold the annular member about the tongues in retracting engagement therewith.

References Cited in the file of this patent

UNITED STATES PATENTS

| Number | Name | Date |
|---|---|---|
| 1,366,687 | Arndt | Jan. 25, 1921 |
| 1,370,319 | Kennedy | Mar. 1, 1921 |
| 1,516,547 | Powell | Nov. 25, 1924 |
| 1,572,770 | Colley | Feb. 9, 1926 |
| 1,737,375 | King | Nov. 26, 1929 |
| 2,076,043 | Ryder | Apr. 6, 1937 |